Feb. 22, 1955 W. B. WATSON 2,702,853

WAVE SHAPING CIRCUITS

Filed Feb. 8, 1950

Inventor:
Wallace B. Watson,
by Merton D. Morse
His Attorney.

United States Patent Office 2,702,853

Patented Feb. 22, 1955

2,702,853

WAVE SHAPING CIRCUITS

Wallace B. Watson, Clay, N. Y., assignor to General Electric Company, a corporation of New York Application February 8, 1950, Serial No. 143,137

4 Claims. (Cl. 250—27)

This invention relates to electrical wave shaping circuits and particularly to the type commonly referred to as clamping circuits.

It is often desirable to produce or modify electrical wave shapes for use in control or measuring circuits to insure a predetermined action. In the case where wave shapes are to be generated or modified under control of triggering signals, there is special need for circuit arrangements providing a reliable response, and also a constant wave shape output despite random occurrence of the triggering signals. For example, the need often arises for producing square waves of fixed width at a random repetition rate.

An object of this invention is to provide an improved wave shaping circuit.

Another object of this invention is to provide electrical signals of fixed wave shape at any desired repetition rate, including a random rate, of triggering signals.

A still further object of this invention is to provide an improved circuit delivering output signals having uniform wave shapes at a desired repetition rate.

A still further object of my invention is to provide an improved electrical circuit for limiting a sawtooth wave to a voltage between two fixed amplitude levels.

The novel features which I believe to be characteristic of my invention, are set forth with particularity in the appended claims. My invention itself, however, both as to its organization and method of operation, together with further objects and advantages thereof may best be understood by reference to the following description taken in connection with the accompanying drawing wherein Fig. 1 discloses a preferred embodiment of applicant's invention in circuit diagram form. Fig. 2 illustrates the wave forms encountered in the operation of the circuit arrangement of Fig. 1.

Figure 1:
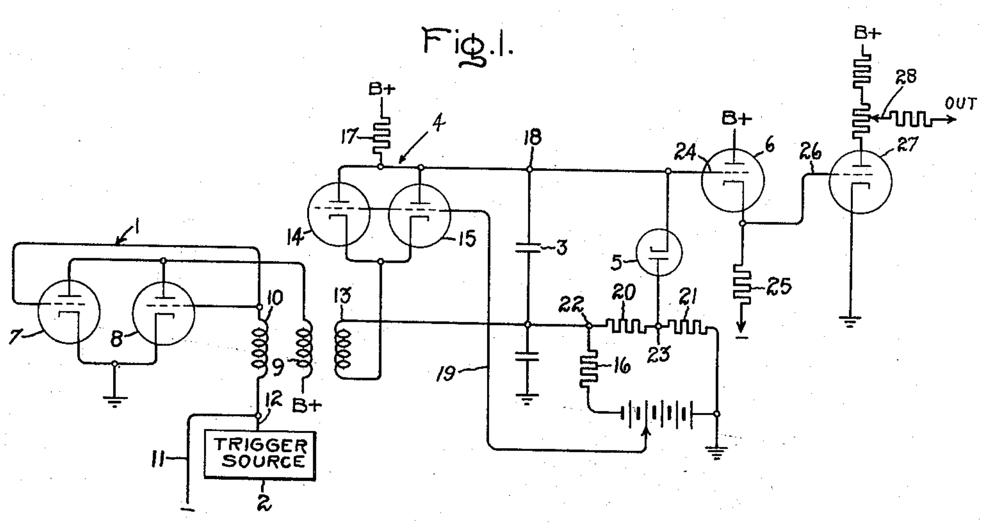
Figure 2:
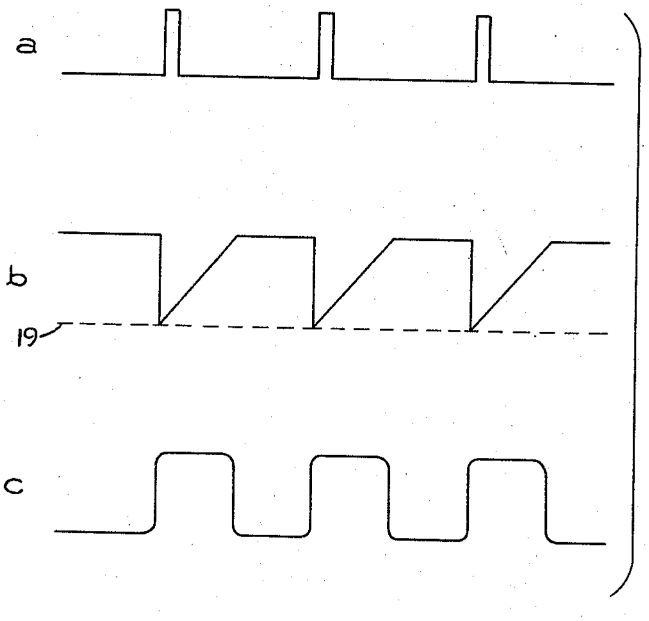

Briefly, the arrangement of Fig. 1 illustrates a method of deriving square waves of constant width despite random occurrence of triggering impulses. Circuit 1 comprises a blocking oscillator producing negative pulses, which may be of spike shape, in response to applied triggering signals of desired repetition rate available from source 2. These pulses are employed to initiate the rapid discharge of condenser 3 through discharge circuit 4. Condenser 3 thereupon charges substantially linearly at the conclusion of each discharge period as initiated by the negative pulses generated by oscillator 1. To maintain the sawtooth voltage developed by condenser 3 between two fixed amplitude levels, diode 5 is employed to limit the sawtooth wave at its lowest level, whereas cathode follower 6 is arranged to draw grid current during the upper level of the sawtooth wave thereby determining the upper level. The net result of the circuit arrangement is to provide sawtooth waves *b*, as shown in Fig. 2, in response to the trigger pulses *a*. These sawtooth waves of constant width are then employed to generate the uniform square wave *c*.

Referring in detail to Fig. 1, circuit 1 comprises the blocking oscillator fed with positive going triggering pulses from source 2. The pulses from source 2 may be periodic or of random occurrence, the only requirement being that they have wave shape to provide proper triggering of the blocking oscillator circuit 1. Oscillator 1 comprises two electron discharge devices 7 and 8 connected in parallel by having their cathodes tied to ground and their plate electrodes connected in parallel to an output transformer 9. In normal blocking oscillator fashion, a secondary winding 10 is provided and coupled to the primary winding 9 to have voltage pulses induced therein from winding 9. Tubes 7 and 8 are normally biased to non-conduction by a negative signal applied through secondary winding 10 over lead 11. Positive going trigger pulses from 2, available over lead 12, overcome this negative bias available over lead 11 sufficiently to vary the conduction of tubes 7 and 8, which enhanced by the feedback provided by windings 9 and 10 results in substantially instantaneous conduction of tubes 7 and 8 thereby delivering a high voltage pulse to the output winding 13 coupled to winding 9 as shown having polarity to drive the cathodes of tubes 14 and 15 negative. Thus, in response to each triggering signal, a strong positive signal pulse shown by *a* of Fig. 2, is developed in winding 9 which, in turn, induces a negative pulse of voltage in winding 13.

Tubes 14 and 15 comprise the discharge path for condenser 3. Condenser 3 has one terminal 22 connected by resistor 16 to a source of negative potential the positive terminal of which may be grounded. Its opposite terminal 18 is connected by resistor 17, comprising the plate load resistor of tubes 14 and 15, to a source of positive potential. Thus terminal 18 of condenser 2 would normally rise to some positive voltage level with respect to ground. Under normal conditions, the common grids of tubes 14 and 15 are biased to a greater negative potential with respect to ground, by means of negative bias available over lead 19, than the negative bias available over resistor 16 and winding 13 connected to common cathodes of tubes 14 and 15. This normally maintains tubes 14 and 15 at cut off. However, upon arrival of a negative pulse of voltage at winding 13, the cathode electrodes of tubes 14 and 15 are driven sufficiently negative to allow conduction of tubes 14 and 15. It will be noted that the electron discharge paths of tubes 14 and 15 are coupled by means of winding 13 directly across condenser 3 such that in their conductive state they provide a substantially instantaneous discharge of condenser 3 as evidenced by wave shape *b* of Fig. 2.

Since the extent to which condenser 3 will be discharged may vary due to the relatively indefinite cutoff characteristic of tubes 14 and 15, it is desirable to prevent terminal 18 from falling below a predetermined level such as the level 19 shown by the dotted line adjacent curve *b* of Fig. 2. To this end, a voltage divider, comprising resistors 16, 20 and 21, is provided between the source of negative voltage applied to resistor 16 and ground. Terminal 22, therefore, is maintained at a negative voltage determining the potential of the cathodes of tubes 14 and 15 during the non-conducting state of tubes 14 and 15. Terminal 23 is maintained at a fixed negative potential which is less negative than that of terminal 22. Diode 5 is provided with its plate electrode connected to terminal 23 and its cathode electrode connected to terminal 18. This arrangement prevents terminal 18 from going more negative than terminal 23 during discharge of condenser 3, since any tendency for terminal 18 to go more negative than the level determined by the voltage at terminal 23 results in conduction of diode 5 thereby clamping or limiting the potential of terminal 18 to that of terminal 23.

Thus in response to each negative pulse available in winding 13, condenser 3 is discharged to the level 19 shown in *b* of Fig. 2 because of the limiting action of diode 5. As soon as the negative pulse on winding 13 has terminated, tubes 14 and 15 are once again cut off by the negative bias available at their grid electrodes thereby permitting condenser 3 to charge up towards the potential of the voltage source B+ connected to resistor 17.

The voltage on condenser 3 is supplied to the grid electrode 24 of cathode follower 6 resulting in a positive going voltage being developed across the cathode load resistor 25. The positive going output voltage developed across the cathode load resistor 25 is applied to the grid electrode 26 of amplifier tube 27. Amplifier tube 27, which is normally cut off by the negative bias supplied through resistor 25 to its grid 26, is arranged to conduct and draw grid current when the voltage at cathode of device 6 becomes substantially 0 volts. A value of substantially 0 volts at cathode of device 6 corresponds to a voltage of substantially 0 volts on grid 24. By drawing grid current tube 27 prevents the cathode voltage developed across 25 from rising since grid current flow through resistor 25 is in a direction opposite to current flow through this resistance caused by device 6. Tube 6, therefore, in turn commences to draw grid current and effectively limits the positive voltage to which condenser 3 can charge. Thus the limited portion of the sawtooth charging voltage is effective in over driving tube 27 and providing the negative going portions of the square waves shown in Fig. 2*c*. Upon discharge of condenser 3 by the arrival of a succeeding triggering signal, the voltage at terminal 18 drops to level 19 of Fig. 2, thereby cutting off tube 27 and starting a positive going square wave in its output as shown in C of Fig. 2. These positive going square waves available over terminal 23 comprise uniform square waves having a repetition rate depending upon the repetition rate of the triggering signals applied over terminal 12 to oscillator 1.

A brief study of applicant's circuit arrangement will reveal the use of a minimum number of circuit elements for providing a fast-action, reliable generator of square waves having a repetition rate synchronized with that of available triggering signals.

While I have shown only certain preferred embodiments of my invention by way of illustration, many modifications will occur to those skilled in the art and I, therefore, wish to have it understood that I intend, in the appended claims, to cover all such modifications as fall within the true spirit and scope of my invention.

What I claim as new and desire to secure by Letters Patent of the United States is:

1. The combination, in a sawtooth wave generator, of a condenser, a charging circuit therefor, means to discharge recurrently said condenser and a pair of electron discharge devices connected in cascade, and a source of operating potential therefor, each of said devices having an anode connected to the positive terminal of said source, a control electrode, and a cathode, the cathode of the first of said devices being connected through a resistance to one terminal of said condenser and to the negative terminal of said source, the control electrode of said first device being conductively connected to the opposite terminal of said condenser, and the control electrode of said second device being conductively connected to the cathode of said first device, whereby the sawtooth wave produced on said condenser is reproduced between the control electrode and cathode of said second device, bias means between said last control electrode and cathode to prevent conduction therebetween until the voltage of said sawtooth wave exceeds a predetermined value whereby when said value is exceeded current flows between the control electrode and cathode of both of said devices and further charge of said condenser is prevented, and an output circuit connected to the anode of said second device.

2. In a system for generating square waves of constant duration at a desired recurrence rate, the combination of means for generating a sawtooth wave of given slope at said desired recurrence rate, said means including a condenser across which said sawtooth wave is developed, means for maintaining said sawtooth wave between two voltage levels comprising first means for preventing the discharge of said condenser below one of said levels, and second means for preventing the charging of said condenser above the other of said levels, said second means comprising a first electron discharge device having an anode, a cathode and a control electrode, said cathode being connected to one electrode of said condenser through a resistance and said control electrode being conductively connected to the other electrode of said condenser whereby said sawtooth wave generated on said condenser is reproduced on said resistance, and a second electron discharge device having an anode, a cathode and a control electrode, said resistance being connected between said control electrode and cathode of said second electron discharge device whereby when the potential on said resistance attains a predetermined value any further increase in potential on said condenser causes control electrode current to flow in both of said electron discharge devices, thereby maintaining the charge on said condenser at said other charging level.

3. The combination, in apparatus for generating recurrent pulses of fixed duration from recurrent pulses of irregular duration, of a capacitor, a pair of electron discharge devices each having an anode, a cathode, and a control electrode, the cathode of one of said devices being conductively connected to the control electrode of the other of said devices and through a resistance to one terminal of said capacitor, said control electrode of said one device being conductively connected to the other terminal of said capacitor, and the cathode of said other device being connected to said one terminal through means to bias said cathode positively with respect to said one terminal, means to supply operating potential to the anode of said one device and through a resistance to the anode of said other device, and means to supply positive potential through a resistance to the other terminal of said capacitor, means responsive to each of said pulses of irregular duration to discharge said capacitor whereby said capacitor again charges after each of said pulses of irregular duration thereby causing the control electrodes of both of said devices to become positive to such an extent that current flows between the control electrode and cathode of said other device and a saturating current flows in said second resistance whereby pulses appear at the anode of said other device having a duration determined by the rate of charge of said capacitor.

4. The combination, in apparatus for generating recurrent pulses of fixed duration from recurrent pulses of irregular duration, of a capacitor, a pair of electron discharge devices each having an anode, a cathode, and a control electrode, the cathode of one of said devices being conductively connected to the control electrode of the other of said devices and through a resistance to one terminal of said capacitor, said control electrode of said one device being conductively connected to the other terminal of said capacitor, and the cathode of said other device being connected to said one terminal through means to bias said cathode positively with respect to said one terminal, means to supply operating potential to the anode of said one device and through a resistance to the anode of said other device, and means to supply positive potential through a resistance to said other terminal of said capacitor, means to prevent said other terminal from dropping in potential below a predetermined value negative in potential with respect to the potential of said cathode of said other device, means responsive to each of said pulses of irregular duration to discharge said capacitor whereby said capacitor again charges after each of said pulses of irregular duration thereby causing the control electrodes of both of said devices to become positive to such an extent that current flows between the control electrode and cathode of said devices to maintain said other terminal at a second predetermined potential as long as said capacitor remains charged, and a saturating current flows in said second resistance whereby pulses appear at the anode of said other device having a duration determined solely by the time required to cause the potential of said other electrode to change from said one value to said other value.

References Cited in the file of this patent

UNITED STATES PATENTS

| | | |
|---|---|---|
| 2,411,573 | Holst et al. | Nov. 26, 1946 |
| 2,421,025 | Grieg | May 27, 1947 |
| 2,444,782 | Lord | July 6, 1948 |
| 2,490,743 | Sziklai | Dec. 6, 1949 |
| 2,551,595 | Grieg | May 8, 1951 |
| 2,560,167 | Glenn, Jr. | July 10, 1951 |
| 2,561,475 | Jacobsen | July 24, 1951 |
| 2,567,247 | Spalding | Sept. 11, 1951 |
| 2,573,150 | Lacy | Oct. 30, 1951 |